US007610314B2

(12) United States Patent
Souder et al.

(10) Patent No.: US 7,610,314 B2
(45) Date of Patent: *Oct. 27, 2009

(54) ONLINE TABLESPACE RECOVERY FOR EXPORT

(75) Inventors: Benny Souder, Belmont, CA (US); James Stamos, Saratoga, CA (US); Hung Tran, Sunnyvale, CA (US); Francisco Sanchez, San Carlos, CA (US); Lik Wong, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 11/245,589

(22) Filed: Oct. 7, 2005

(65) Prior Publication Data

US 2007/0083563 A1    Apr. 12, 2007

(51) Int. Cl.
*G06F 12/00* (2006.01)
*G06F 17/30* (2006.01)

(52) U.S. Cl. ............................... 707/200; 707/1; 707/10; 707/204; 711/162

(58) Field of Classification Search ................ 707/1–10, 707/100–104.1, 200–206; 709/203; 711/161, 711/162
See application file for complete search history.

(56) References Cited

U.S. PATENT DOCUMENTS

| 5,222,235 A | 6/1993 | Hintz et al. |
| 5,396,623 A | 3/1995 | McCall et al. |
| 5,454,101 A | 9/1995 | Mackay et al. |
| 5,551,020 A | 8/1996 | Flax et al. |
| 5,579,516 A | 11/1996 | Van Maren et al. |
| 5,692,174 A | 11/1997 | Bireley et al. |
| 5,758,345 A | 5/1998 | Wang |
| 5,787,445 A | 7/1998 | Daberko |
| 5,787,446 A | 7/1998 | Dang et al. |
| 5,819,298 A | 10/1998 | Wong et al. |
| 5,864,853 A | 1/1999 | Kimura et al. |
| 5,870,746 A | 2/1999 | Knutson et al. |
| 5,890,167 A | 3/1999 | Bridge, Jr. et al. |

(Continued)

FOREIGN PATENT DOCUMENTS

EP    0 992 909 A2    4/2000

(Continued)

OTHER PUBLICATIONS

Wickremesinghe et al., Distributed computing with load-managed active storage, Jul. 23-26, 2002, IEEE, 13-23.*

(Continued)

*Primary Examiner*—Jean B Fleurantin
(74) *Attorney, Agent, or Firm*—Hickman Palermo Truong & Becker LLP

(57) ABSTRACT

To export source tablespaces, an auxiliary database system is created and started with a minimum configuration. Copies of versions of the source tablespaces are restored from database backups to the auxiliary database system. A copy of a version of a tablespace is referred to herein as a tablespace instance. The tablespace instances restored from database backups are recovered to a particular point-in-time. A script is then generated. The script can be executed by a database server of the destination database to import the tablespace instances.

26 Claims, 3 Drawing Sheets

U.S. PATENT DOCUMENTS

| | | | |
|---|---|---|---|
| 5,890,169 | A | 3/1999 | Wong et al. |
| 5,944,818 | A | 8/1999 | Baxter et al. |
| 6,035,379 | A | 3/2000 | Raju et al. |
| 6,035,412 | A | 3/2000 | Tamer et al. |
| 6,085,200 | A | 7/2000 | Hill et al. |
| 6,272,503 | B1 | 8/2001 | Bridge, Jr. et al. |
| 6,272,505 | B1 * | 8/2001 | De La Huerga .......... 715/501.1 |
| 6,578,068 | B1 | 6/2003 | Bowman-Amuah |
| 6,694,306 | B1 | 2/2004 | Nishizawa et al. |
| 6,978,282 | B1 | 12/2005 | Dings et al. |
| 6,993,657 | B1 | 1/2006 | Renner et al. |
| 7,058,958 | B1 | 6/2006 | Shutt et al. |
| 7,487,168 | B2 | 2/2009 | Rys et al. |
| 2002/0073139 | A1 | 6/2002 | Hawkins et al. |
| 2002/0091702 | A1 | 7/2002 | Mullins |
| 2002/0143733 | A1 * | 10/2002 | Mukkamalla et al. .......... 707/1 |
| 2002/0169745 | A1 | 11/2002 | Hotti et al. |
| 2003/0014523 | A1 | 1/2003 | Teloh et al. |
| 2003/0172158 | A1 | 9/2003 | Pillai et al. |
| 2003/0208505 | A1 | 11/2003 | Mullins et al. |
| 2003/0212789 | A1 | 11/2003 | Hamel et al. |
| 2004/0024979 | A1 | 2/2004 | Kaminsky et al. |
| 2004/0034615 | A1 | 2/2004 | Thomson et al. |
| 2004/0034669 | A1 | 2/2004 | Smith et al. |
| 2004/0153459 | A1 | 8/2004 | Whitten et al. |
| 2007/0129953 | A1 | 6/2007 | Cunningham et al. |

FOREIGN PATENT DOCUMENTS

| | | |
|---|---|---|
| WO | WO 02005116 A2 | 7/2000 |
| WO | WO 02/097676 A2 | 12/2002 |

OTHER PUBLICATIONS

Veiga, et al., Complete distributed garbage collection: an experience with Rotor, 5, Oct. 27, 2003, IEEE, vol. 150, 283-290.*

Jiri Schindler et al., Lachesis: robust database storage management based on device-specific performance characteristics, Sep. 2003, ACM, 706-717.*

International Preliminary Examining Authority, "Notification of Transmittal of International Preliminary Report on Patentability," PCT/US2004/025805, dated Nov. 18, 2005, 16 pages.

* cited by examiner

ONLINE TABLESPACE RECOVERY FOR EXPORT

RELATED APPLICATIONS

U.S. application Ser. No. 10/353,381, entitled Pluggable Tablespaces For Database Systems, filed by Juan R. Loaiza, et al. on Jan. 28, 2003 now issued as U.S. Pat. No. 6,804,671, the contents of which are incorporated herein by reference U.S. application Ser. No. 08/865,693, entitled Tablespace-Relative Database Pointers, filed by William H. Bridge Jr, et al. on May 30, 1997 now issued as U.S. Pat. No. 6,272,503, the contents of which are incorporated herein by reference.

U.S. application Ser. No. 10/718,747, entitled Automatic And Dynamic Provisioning of Databases, filed by Benny Souder, et al. on Nov. 21, 2003, the contents of which are incorporated herein by reference.

FIELD OF THE INVENTION

The present invention relates to database technology, and in particular, exporting data between databases of different database systems.

BACKGROUND

A tablespace transport mechanism is a powerful and very useful mechanism for importing/exporting data between databases. A tablespace is a collection of storage containers (e.g. files) used to store data for database objects (e.g. relational tables). A tablespace transport mechanism exports tablespaces from a "source database" and imports them into a "destination database". This capability allows the files of a tablespace to be copied using operating system utilities for copying files, which run much faster than other techniques for bulk transfer of data between databases. Such other techniques involve executing queries and insert statements.

A tablespace is imported to a database by attaching it to the database. The term "attach" refers to configuring a database and/or its database server so that the tablespace can be used by the database server to store, access, and/or modify database data in the tablespace.

A tablespace may be transported to a database by creating a separate copy of the tablespace from the original source database and attaching it to the destination database. While the copy is being made, operations on the tablespace are restricted to read-only operations.

Restricting a source tablespace to read-only operations for any period of time can be disruptive to users of the database. Separate copies of the tablespace can be generated using other techniques that do not require that the source tablespace be rendered read-only, but such other techniques are expensive in terms of manual effort and/or resource usage.

For example, backup utilities may be used to automatically produce an entire database that contains the source tablespace. This procedure automatically creates separate copies of all the source tablespaces in a separate database of another database server from backups of the source database. Thus, the source tablespaces are not used and remain fully accessible while the duplicates are being produced.

However, use of this capability has several major drawbacks. First, a separate database server requires manual effort to install and/or provision resources for. Second, the database can be huge; duplicating one can require a lot of storage resources, time, and processing.

Other approaches avoid the need to duplicate the entire database, but the approaches are manually intensive and error prone. For example, a human DBA configures from scratch and starts a separate database server with a new database. Next, from backup, the DBA restores and recovers in the new database only the tablespaces to export as well as other system required tablespaces. This creates separate copies of tablespaces to export. This procedure involves many steps that must be manually performed by the DBA.

Clearly, there is a need for an approach for exporting tablespaces that does not require rendering source tablespaces read-only and that requires less resources or manual effort to perform.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for automated online exportation of tablespaces. The exportation of tablespaces is referred as being online because the source tablespaces do not have to be made read-only in order to export the tablespaces. To export the tablespace, an auxiliary database system is automatically created and started with a minimum configuration. Copies of versions of the source tablespaces and other required tablespaces are restored from database backups of the source database to the auxiliary database system. A copy of a version of a tablespace is referred to herein as a tablespace instance. The tablespace instances restored from database backups are recovered to a particular point-of-time. A script is then generated. The script can be executed by a database server of the destination database to import the tablespace instances.

Illustrative Database Environment

Figure 1:
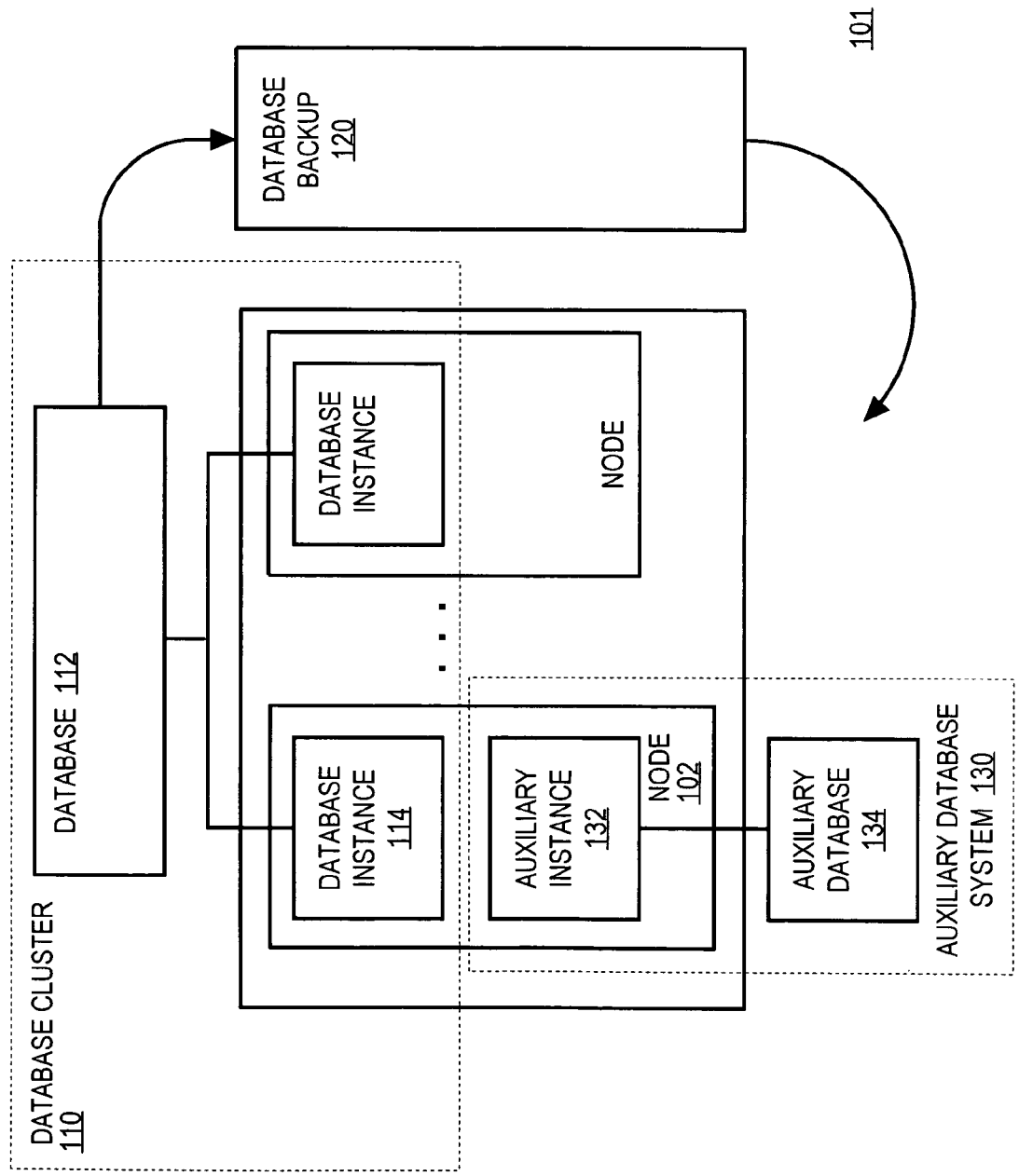
FIG. 1 is a diagram of a database system environment used to illustrate an embodiment of the present invention.

FIG. 1 shows a database system environment 101 used to illustrate an embodiment of the present invention. Referring to FIG. 1, it shows database cluster 110, database backup 120, and auxiliary database system 130. A database cluster, such as database cluster 110, is a set of database servers that run a multi-node system and that manage access to a particular database. The node may be in the form of computers (e.g.

work stations, personal computers) interconnected via a network, and may be part of a grid.

As the term is used herein, a server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes can be allocated to running a particular server's software. A particular combination of the software on a node and the allocation of the resources from the node is a server that is referred to herein as a server instance or instance. Thus, a "multi-node server" comprises multiple server instances that can run on multiple nodes. Several instances of a multi-node server can even run on the same node.

A database server governs and facilitates access to a particular database, processing requests by clients to access the database. A multi-node database server comprises multiple "database instances", each database instance running on a node, and governing and facilitating access to one or more databases. Database instances may also run on the same node. Database instances of database system cluster 101 manage access to database 112. These database instances include database instance 114.

Database backup 120 is a backup copy of database 112. Database backup 120 includes backup copies of individual tablespaces of database 112. Database backup 120 reflects the state of database 112 and its tablespaces, or a specific portion thereof, at a particular point-in-time, referred to herein as the backup's point-in-time.

Database backup 120 is created using database backup and recovery utilities. One such utility is RMAN. RMAN is a database backup and recovery utility available from Oracle Corporation. A database backup and recovery utility may also provide the capability to restore and recover a database from a set of backups, and restore and recover a particular tablespace from the set of backups.

A database backup and recovery utility may also perform point-in-time recovery, which is an operation to recover a database from a database backup to a point of time after the backup point of the database backup. To perform point-in-time recovery, redo records from a redo log for database 112 are applied to tablespace instances restored from database backup 120. A redo log contains redo records describing transactions committed by database cluster 110. Database systems use logging mechanisms to track operations (e.g. a delete, insert, and update of a row) that change user data in a database system so that the operations may be recovered in the event of a database system failure.

Auxiliary Database

Auxiliary database system 130 is automatically created and started for the purpose of exporting source tablespaces. Auxiliary database system 130 includes database instance 132 and auxiliary database 134. Auxiliary database 134 comprises the tablespace instances of source tablespaces to be transported, as well as other tablespaces needed to make auxiliary database system 130 operational. These other tablespaces include tablespaces that, for example, store data definitions (metadata that defines database objects, such as database tables) or store undo records, records for undoing changes to a database by transactions. The tablespace instances are restored from database backups 120 to a particular point-in-time using point-in-time recovery capability of database backup and recovery utilities.

Auxiliary database system 130 has a minimum configuration, one that need only be sufficient to support restoration and recovery of tablespace instances of the source tablespaces. In this way, the amount of processing and resources used to create and start auxiliary database systems is minimized.

For example, database instance 114 is intended to support a large number of user requests. It may be configured to, for example, run a large number of database processes and user sessions, to interact with a network of database cluster 110 and participate as a member of the database cluster, and manage access to the whole of database 112. On the other hand, auxiliary database instance 132 is not configured to support a large number database processes and users, to interact with the network of database cluster 110 and participate as a member of database cluster 110.

In fact, to further minimize processing and resources needed to create, start, and run auxiliary database instance 132, it shares the same host of an already running database instance for the source database, namely database instance 114. As a consequence, database instances 114 and 132 can execute the same executable database server software stored on node 102. There is no need to install database server software in order to create and start auxiliary database instance 132. The work and resources needed for auxiliary database system 130 is thereby minimized.

Automated Procedure For Generating Exportable Tablespace Instances

Figure 2:
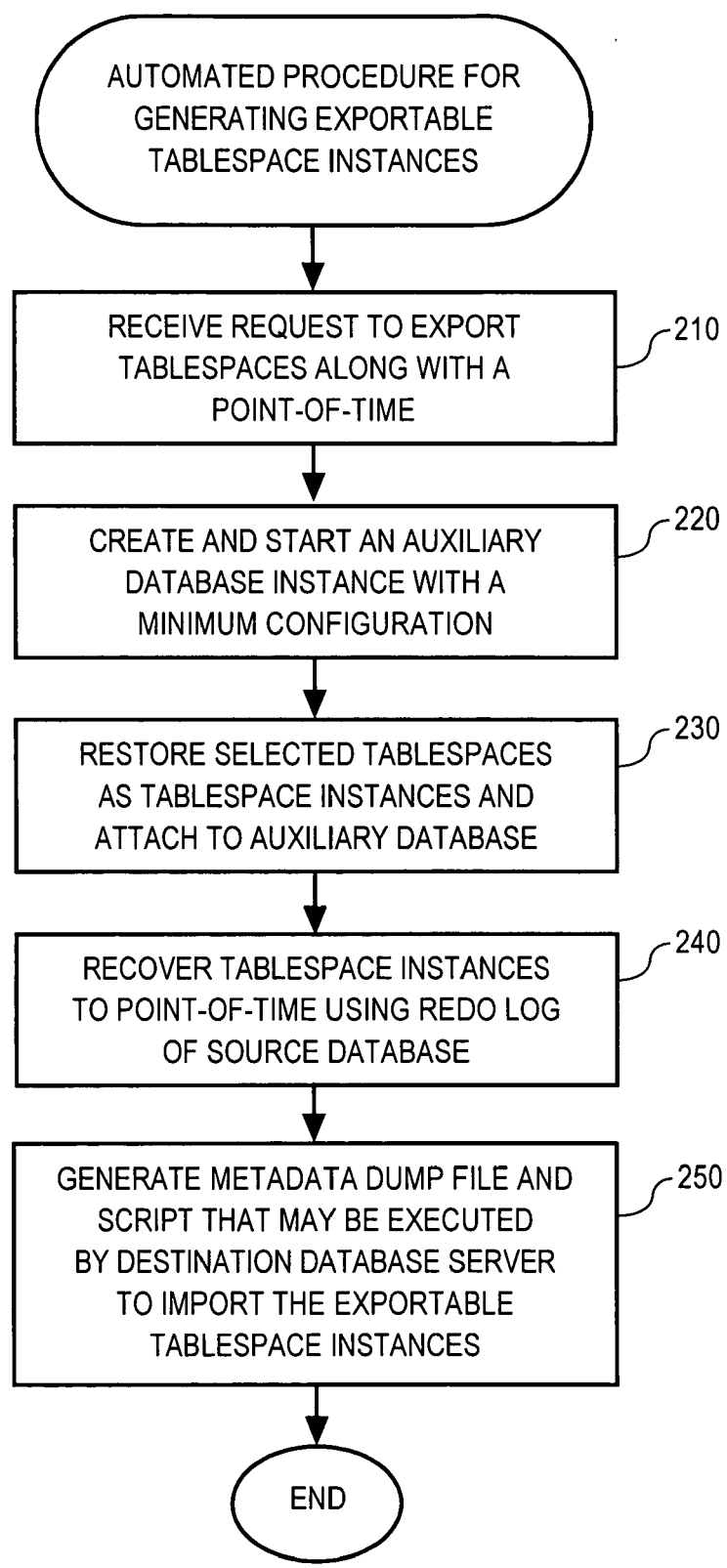
FIG. 2 is a diagram of a procedure for online exporting of tablespaces according to an embodiment of the present invention.

FIG. 2 is a flow chart depicting a procedure for online exportation of tablespaces. The procedure is performed automatically because the steps are performed by a utility (i.e. software) rather than a human. A user need only supply input to the utility, in the form of source tablespaces to export and a point-in-time that the exportable tablespaces instances should be recovered to. The procedure generates tablespace instances of the source tablespaces, referred to herein as exportable tablespace instances. The procedure is illustrated using database system environment 101.

Referring to FIG. 2, at step 210, a request to export source tablespaces from database 112 is received. The request may include a specified point-of-time that the exportable tablespace instances generated should reflect, i.e. the point-of-time they should be recovered to.

At step 220, auxiliary database system 130 is created and started with a minimum configuration as discussed previously. Database instance 132 is started on same node that database instance 114 runs on, which is node 102. Alternatively, database instance 132 may be started on a different node.

At step 230, the source tablespaces are restored as tablespace instances thereof, that is, tablespace instances of the source tablespace are created from database backup 120 and attached to auxiliary database 134.

At step 240, the recovered tablespaces instances are recovered to the requested point-of-time, using redo logs for database 112. Redo records from the redo logs of database 112 are applied to the restored tablespace instances to modify them to a state consistent with the source tablespaces at the specified point-of-time. Once fully recovered, the tablespace instances recovered become the exportable tablespace instances.

According to an embodiment, database backup and recovery software is called to restore the source tablespace instances and/or recover the tablespace instances to the point-of-time.

At step 250, a metadata dump file and script is generated. The metadata dump file contains metadata describing the exportable tablespace instances. The metadata dump file can be used by a destination database instance to attach the tablespace instances. The script is written in commands that can be executed by a database server to attach the exportable tablespaces to the destination database.

Finally, after performing the procedure, the auxiliary database system may be shutdown and removed from node 102. The other tablespaces that store the data definitions and undo records may also be removed.

Hardware Overview

Figure 3:
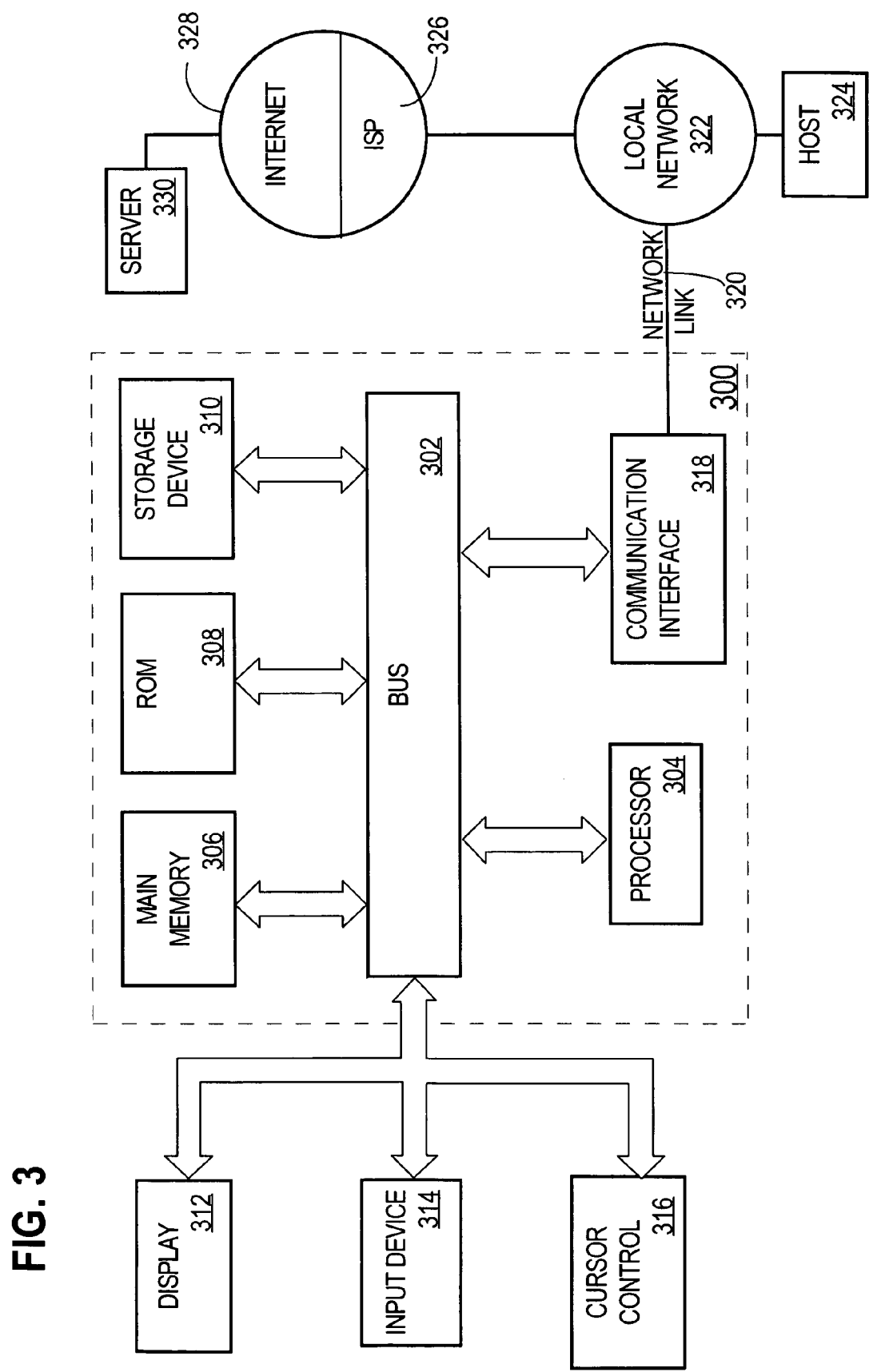
FIG. 3 is a diagram of a computer system that may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that store digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   receiving a request to export one or more source tablespaces from a source database that includes a plurality of tablespaces, said plurality of tablespaces including said one or more source tablespaces; and
   in response to receiving said request, performing certain steps to export said one or more source tablespaces, said certain steps comprising:
      creating an auxiliary database system on a node, said auxiliary database system comprising an auxiliary database server and an auxiliary database;
      generating from a backup of said source database one or more tablespace instances for export of said one or more source tablespaces; and
      incorporating said one or more tablespace instances into said auxiliary database;
   wherein the method is performed by one or more computing devices.

2. The method of claim 1, wherein the certain steps include recovering said one or more tablespace instances to a certain point-of-time based on redo logs for said source database.

3. The method of claim 2, wherein the point-in-time is user-selected.

4. The method of claim 1, wherein creating an auxiliary database system includes creating the auxiliary database system on a node that already hosts another database server.

5. The method of claim 4, wherein the auxiliary database server and said another database server comprise the same executable software.

6. The method of claim 1, wherein after completing the generation of said one or more tablespace instances for export, removing said auxiliary database system from said node.

7. The method of claim 1, wherein the specific source tablespaces to be exported are user-selected.

8. The method of claim 1, wherein the auxiliary database system comprises a minimum configuration sufficient to support restoration and recovery of the source tablespaces.

9. The method of claim 1, further comprising:
   generating a metadata dump file describing one or more of the source tablespaces; and
   generating a script written in commands executable by a database server for attaching the one or more source tablespaces to the auxiliary database.

10. A computer-implemented method, comprising:
    receiving a request to export one or more source tablespaces from a source database that includes a plurality of tablespaces, said plurality of tablespaces including said one or more source tablespaces; and
    in response to receiving said request, performing certain steps to export said one or more source tablespaces, said certain steps comprising:
       creating an auxiliary database system on a node, said auxiliary database system comprising an auxiliary database server and auxiliary database;
       restoring from a backup of said source database one or more tablespace instances of said one or more source tablespaces;
       recovering said one or more tablespace instances to a certain point-of-time based on redo logs for the source database; and
       incorporating said one or more table space instances into said auxiliary database;
    wherein the method is performed by one or more computing devices.

11. The method of claim 10, wherein creating an auxiliary database system includes creating the auxiliary database system on a node that already hosts another database server.

12. The method of claim 10, wherein after recovering said one or more tablespace instances, removing said auxiliary database system from said node.

13. The method of claim 10, further comprising:
    generating a metadata dump file describing one or more of the source tablespaces; and
    generating a script written in commands executable by a database server for attaching the one or more source tablespaces to the auxiliary database.

14. A machine-readable storage medium storing one or more sequences of instructions which, when executed by one or more processors, causes the one or more processors to perform the steps of:
    receiving a request to export one or more source tablespaces from a source database that includes a plurality of tablespaces, said plurality of tablespaces including said one or more source tablespaces; and
    in response to receiving said request, performing certain steps to export said one or more source tablespaces, said certain steps comprising:
    creating an auxiliary database system on a node, said auxiliary database system comprising an auxiliary database server and auxiliary database;
    generating from a backup of said source database one or more tablespace instances for export of said one or more source tablespaces; and
    incorporating said one or more table space instances into said auxiliary database.

15. The machine-readable storage medium of claim 14, wherein the certain steps include recovering said one or more tablespace instances to a certain point-of-time based on redo logs for said source database.

16. The machine-readable storage medium of claim 15, wherein the point-in-time is user-selected.

17. The machine-readable storage medium of claim 14, wherein creating an auxiliary database system includes creating the auxiliary database system on a node that already hosts another database server.

18. The machine-readable storage medium of claim 17, wherein the auxiliary database server and said another database server comprise the same executable software.

19. The machine-readable storage medium of claim 14, wherein after completing the generation of said one or more tablespace instances for export, removing said auxiliary database system from said node.

20. The machine-readable storage medium of claim 14, the steps further comprising:

generating a metadata dump file describing one or more of the source tablespaces; and generating a script written in commands executable by a database server for attaching the one or more source tablespaces to the auxiliary database.

21. The machine-readable storage medium of claim 14, wherein the specific source tablespaces to be exported are user-selected.

22. The machine-readable storage medium of claim 14, wherein the auxiliary database system comprises a minimum configuration sufficient to support restoration and recovery of the source tablespaces.

23. A machine-readable storage medium storing one or more sequences of instructions which, when executed by one or more processors, causes the one or more processors to perform the steps of:

receiving a request to export one or more source tablespaces from a source database that includes a plurality of tablespaces, said plurality of tablespaces including said one or more source tablespaces; and in response to receiving said request, performing certain steps to export said one or more source tablespaces, said certain steps comprising:

creating an auxiliary database system on a node, said auxiliary database system comprising an auxiliary database server and auxiliary database;

restoring from a backup of said source database one or more tablespace instances of said one or more source tablespaces;

recovering said one or more tablespace instances to a certain point-of-time based on redo logs for the source database; and incorporating said one or more table space instances into said auxiliary database.

24. The machine-readable storage medium of claim 23, wherein creating an auxiliary database system includes creating the auxiliary database system on a node that already hosts another database server.

25. The machine-readable storage medium of claim 23, wherein after recovering said one or more tablespace instances, removing said auxiliary database system from said node.

26. The machine-readable storage medium of claim 23, the steps further comprising:

generating a metadata dump file describing one or more of the source tablespaces; and generating a script written in commands executable by a database server for attaching the one or more source tablespaces to the auxiliary database.

* * * * *

UNITED STATES PATENT AND TRADEMARK OFFICE
CERTIFICATE OF CORRECTION

PATENT NO.       : 7,610,314 B2                                         Page 1 of 1
APPLICATION NO. : 11/245589
DATED            : October 27, 2009
INVENTOR(S)      : Souder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,610,314 B2 | Page 1 of 1 |
| APPLICATION NO. | : 11/245589 | |
| DATED | : October 27, 2009 | |
| INVENTOR(S) | : Benny Souder et al. | |

It is certified that error appears in the above-identified patent and that said Letters Patent is hereby corrected as shown below:

In column 1, line 9, after "reference" insert -- . --.

In column 8, line 15, in claim 10, delete "table space" and insert -- tablespace --, therefor.

In column 8, line 49, in claim 14, delete "table space" and insert -- tablespace --, therefor.

In column 10, line 10, in claim 23, delete "table space" and insert -- tablespace --, therefor.

Signed and Sealed this
Fourth Day of January, 2011

David J. Kappos
*Director of the United States Patent and Trademark Office*